(12) United States Patent
Grignard

(10) Patent No.: US 12,052,975 B1
(45) Date of Patent: Aug. 6, 2024

(54) UNIVERSAL PET CRATE BUMPER

(71) Applicant: Annette Grignard, New York, NY (US)

(72) Inventor: Annette Grignard, New York, NY (US)

( * ) Notice: Subject to any disclaimer, the term of this patent is extended or adjusted under 35 U.S.C. 154(b) by 357 days.

(21) Appl. No.: 17/481,511

(22) Filed: Sep. 22, 2021

Related U.S. Application Data

(63) Continuation-in-part of application No. 17/344,107, filed on Jun. 10, 2021, now abandoned.

(60) Provisional application No. 63/037,658, filed on Jun. 11, 2020.

(51) Int. Cl.
*A01K 1/02* (2006.01)
*A01K 1/035* (2006.01)

(52) U.S. Cl.
CPC ............ *A01K 1/0245* (2013.01); *A01K 1/035* (2013.01)

(58) Field of Classification Search
CPC .... A01K 1/0245; A01K 1/0236; A01K 1/035; A47D 15/00; A47D 15/005; A47D 15/008; A47D 7/00
See application file for complete search history.

(56) References Cited

U.S. PATENT DOCUMENTS

| | | |
|---|---|---|
| 3,137,870 A | 6/1964 | Fink |
| 3,336,610 A * | 8/1967 | Geddings ............. A47G 9/0253 5/923 |
| 5,482,665 A | 1/1996 | Gill |
| D613,910 S | 4/2010 | Clemmons et al. |
| D634,485 S | 3/2011 | Clemmons et al. |
| 8,539,626 B2 | 9/2013 | Dunne et al. |
| 9,282,719 B2 | 3/2016 | Peregoy |
| 9,485,957 B2 | 11/2016 | Kellogg |

(Continued)

FOREIGN PATENT DOCUMENTS

| | | | |
|---|---|---|---|
| CN | 105309329 A | * | 2/2016 |
| DE | 202018003029 U1 | * | 8/2018 ........... A47D 15/008 |

(Continued)

OTHER PUBLICATIONS

Cook, Cathy, Bumpers for 36" DogCrate, earliest review date Sep. 6, 2015. https://www.etsy.com/listing/86819633/bumpers-for-36-dog-crate (Year: 2015).*

(Continued)

*Primary Examiner* — Tien Q Dinh
*Assistant Examiner* — Katelyn T Truong
(74) *Attorney, Agent, or Firm* — Boris Leschinsky

(57) ABSTRACT

A universal pet crate bumper includes a body having an upper end, a lower end, a front, a rear, an internal batting spanning the length and width of the body, an outer fabric layer enclosing the batting, and at least four vertical lines of stitching extending from the upper end to the lower end and through the batting from the front to the rear. The vertical lines of stitching compress the batting to form distinct panels along the body that correspond to the sidewalls of a pet crate. The lines of stitching define a pivot upon which the body may fold at least 90 degrees such that the body may fit snuggly within the corners of the pet crate. The batting includes a compact and dense structure enabling the body to maintain an upright orientation along the sidewalls of the pet crate without sagging when the bumper is installed.

3 Claims, 8 Drawing Sheets

(56) References Cited

U.S. PATENT DOCUMENTS

| | | |
|---|---|---|
| 10,470,436 B2 | 11/2019 | Koskey |
| 10,492,624 B2 | 12/2019 | Marton et al. |
| 2011/0092936 A1 | 4/2011 | Kunimoto |
| 2011/0113552 A1 | 5/2011 | Miller |
| 2014/0096320 A1* | 4/2014 | Wilson ................ A47D 15/008 5/424 |

FOREIGN PATENT DOCUMENTS

| | | | | |
|---|---|---|---|---|
| GB | 2482591 | | 2/2012 | |
| GB | 2482598 | | 2/2012 | |
| GB | 2522280 A | * | 7/2015 | ........... A47D 15/008 |
| KR | 20170058054 A | * | 11/2015 | |

OTHER PUBLICATIONS

Kevin and Amanda, Dog Crate Bumper Sewing Pattern, Apr. 11, 2013 https://www.kevinandamanda.com/dog-crate-bumper-pads-sewing-pattern/ (Year: 2013).*

Cook, Cathy, Custom 30" Fleece Dog Crate Cover and Pad, earliest review date Jun. 1, 2013 https://www.etsy.com/listing/86818483/custom-30-fleece-dog-crate-cover-and-pad?click_key=a8e6dc6a73821a1a467016768126e277009fb779%3A86818483&click_sum=030325e9&ref=shop_home_active_11 (Year: 2013).*

Pet Dreams, Classic Double Door Cratewear Set, earliest review date Sep. 20, 2006 https://www.petdreams.com/product/dog-crate-beds/ (Year: 2006).*

* cited by examiner

UNIVERSAL PET CRATE BUMPER

CROSS REFERENCE TO RELATED SUBJECT MATTER

This application is a continuation-in-part of U.S. Non-Provisional patent application Ser. No. 17/344,107, filed on Jun. 10, 2021, which claims the benefit of priority of U.S. Provisional Patent Application No. 63/037,658, filed on Jun. 11, 2020, the contents of which are relied upon and incorporated herein by reference in their entirety. The entire disclosure of any publication or patent document mentioned herein is entirely incorporated by reference.

TECHNICAL FIELD

The present disclosure relates generally to bumpers for crates. More particularly, the present disclosure relates to a universal bumper for pet crates, such as dog crates, of all sizes to provide padding and protection to the animal inside the pet crate.

BACKGROUND

Conventional dog crates typically have a front door, a side door, or both a front door and a side door. Conventional dog crates come in a variety of sizes i.e., square footage, to accommodate dogs of different sizes. An exemplary list of the most common dog crate sizes is shown in Table 1.

TABLE 1

Exemplary Dog Crate Sizes

| OVERALL: | X-Small | Small | Medium | Large | X-Large | XX-Large |
|---|---|---|---|---|---|---|
| Length | 48" L | 66" L | 79" L | 95" L | 114" L | 127" L |
| Depth (thickness) | 1" | 1" | 1" | 1" | 1" | 1" |
| Height | 10" H | 10" H | 12" H | 15" H | 15" H | 15" H |

While bumpers may be known in the art for use in dog crates, conventional bumpers are problematic in that they sag or droop along the walls of a crate, do not align properly with corners of a crate, and are specific to a certain size or configuration of a crate, thereby requiring a different size/type of bumper depending on the size of the pet crate and whether the pet crate has a front door or a side door.

Accordingly, there is a need for a universal crate bumper that does not sag, may be positioned precisely into the corners of the pet crate, and may be reconfigured to fit every pet crate size and configuration.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a universal pet crate bumper compatible with both front door and side door pet crates. Accordingly, the present disclosure provides a bumper body including an upper end, a lower end, a front, a rear, a first side, a second side, an internal batting including a uniform thickness spanning the length and width of the body, an outer fabric layer enclosing the internal batting, and at least four vertical lines of stitching extending from the upper end to the lower end and through the internal batting from the front to the rear. Each of the at least four vertical lines of stitching compress the internal batting along the respective line of stitching to form distinct panels along the body between the lines of stitching. The lines of stitching define a pivot upon which the body may fold at least 90 degrees such that the body may fit snuggly within the corners of the pet crate. The lines of stitching are spaced from the first side at predetermined distances based on the size of the pet crate to enable folding and reconfiguration of the body at certain pivots to accommodate a pet crate with a front door, side door, or both.

Another aspect of an example embodiment in the present disclosure is to provide a universal pet crate bumper that does not sag or droop when installed on the sidewalls of a pet crate. Accordingly, the internal batting includes a cohesive batting having a high density, uniform and compact structure enabling the body to maintain an upright orientation along the sidewalls of the pet crate without sagging when the bumper is installed.

Yet another aspect of an example embodiment in the present disclosure is to provide a universal pet crate bumper including a means for fastening the bumper to the pet crate. Accordingly, the bumper body further includes a plurality of fasteners disposed on the rear of the body and positioned adjacent to the upper end. The fasteners comprise a fixed portion attached to the rear of the body and a free portion pivotally connected to the fixed portion enabling pivoting with respect to the body and the fixed portion. The free portion is removably attachable to the fixed portion and includes a length enabling the free portion to wrap around a bar of the pet crate and engage the fixed portion to fasten the body to the sidewalls of the pet crate.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

Figure 1A:
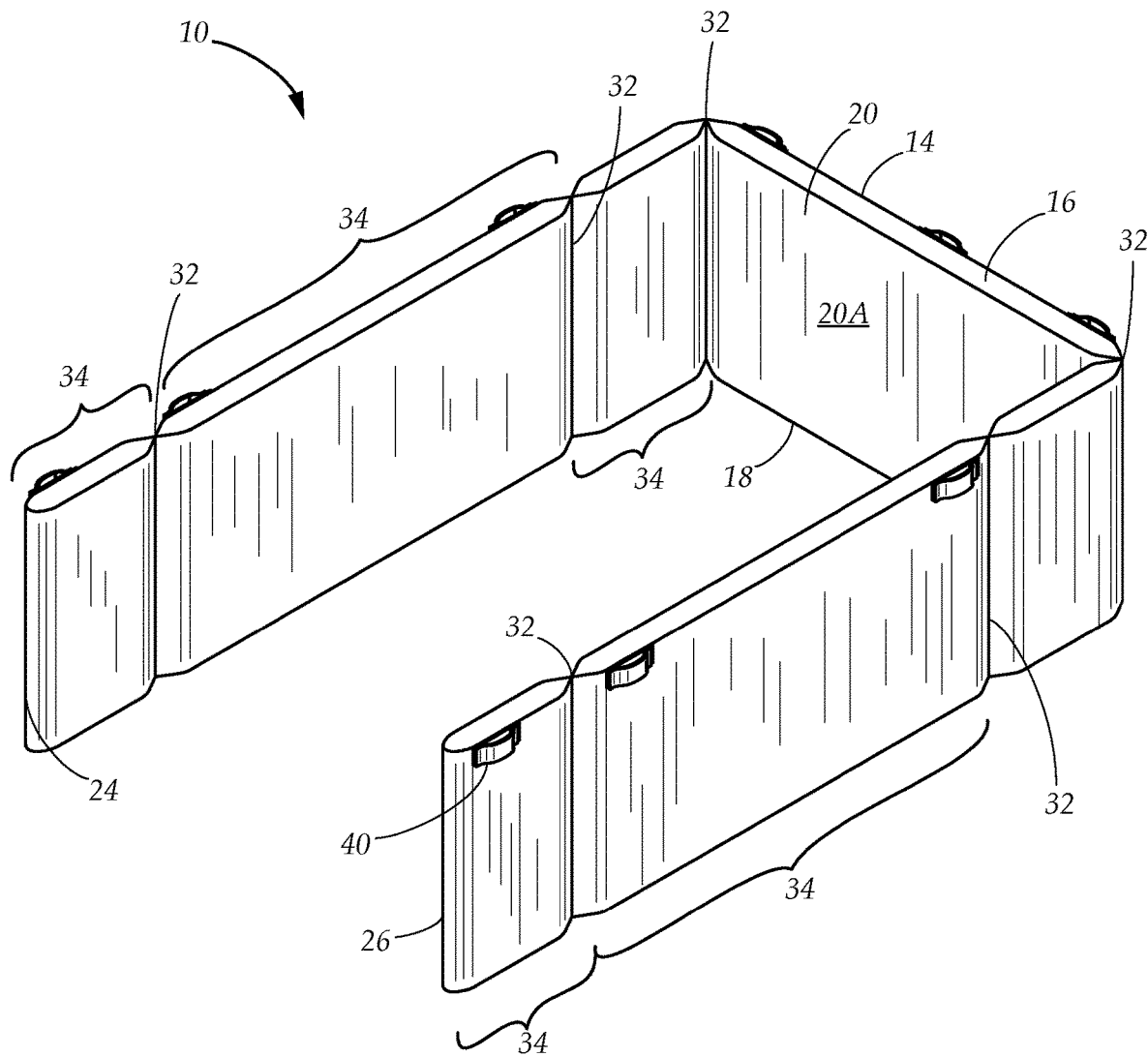
FIG. 1A is a perspective view of the universal pet crate bumper, illustrating the bumper in the front-door configuration according to one embodiment of the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

FIG. 1A, FIG. 1B, FIG. 1C, FIG. 2A, FIG. 2B, FIG. 2C, and FIG. 5 illustrate a universal pet crate bumper 10 for installation within a pet crate 12, such as dog crate, to line the sidewalls 38 of the pet crate and provide protective padding for a pet animal 11 placed inside of the pet crate 12. The universal pet crate bumper 10 is configured to accommodate a pet crate having a front door, a side door, or both. The universal pet crate bumper 10 comprises a rectangular and unitary bumper body 14 including an upper end 16, a lower end 18 opposite the upper end 16, a front side 20 including a front surface 20A, a rear side 22 including a rear surface 22B, the front side 20 opposite the rear side 22, a first end 24, a second end 26 opposite the first end 24, an internal batting 28 (see FIG. 5) including a uniform thickness spanning the length and width of the body 14, an outer fabric layer 30 (see FIG. 5) enclosing the internal batting 28, at least four vertical lines of stitching 32 extending from the upper end 16 to the lower end 18 and through the internal batting 28 from the front surface 20A to the rear surface 22B, and a plurality of fasteners 40 disposed on the rear surface 22B of the body 14 for removably attaching the body 14 to the sidewalls 38 of the pet crate 12.

Each of the at least four vertical lines of stitching 32 compresses the internal batting 28 along a straight line of stitching to form at least five distinct panels 34 along the body between the lines of stitching 32. Each of the at least four lines of stitching 32 defines a pivot upon which the panels 34 are capable of folding with respect to one another. The internal batting 28 includes a compact, dense, and firm structure enabling the body 14 to maintain an upright orientation along the sidewalls 38 of the pet crate. The internal batting 28 includes a thickness of at least one inch and a weight of 400-600 grams per square meter ($g/m^2$) or 11.80-17.70 ounces per square yard ($oz/yd^2$). In embodiments, the internal batting 28 includes a thickness of at least one inch and a weight of 500 grams per square meter ($g/m^2$) or 14.75 ounces per square yard ($oz/yd^2$). This range of weight and thickness of the batting 28 prevents the bumper 10 from sagging or drooping along its length when installed in the pet crate 12. The internal batting 28 can be cohesive batting with high density and uniform bonding for structure; polyester, garneted batting, dry fiber blended with low melt bond fiber. Owing to the internal batting, the universal bumper is machine washable. The internal batting may also include spray resin bond on its top and bottom surfaces.

Figure 1B:
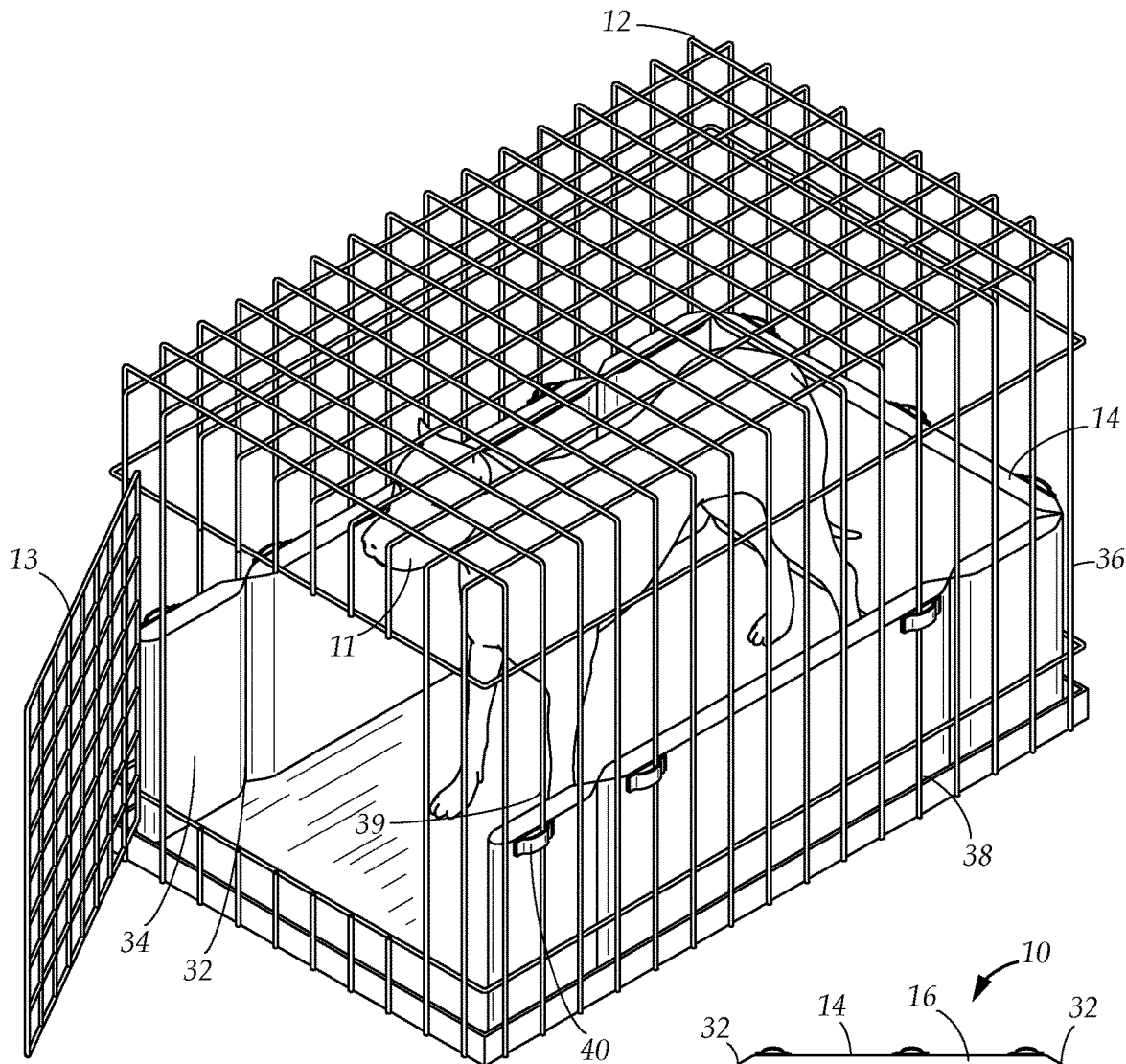
FIG. 1B is a perspective view of the universal pet crate bumper installed within a pet crate having a front door, illustrating the front-door configuration of the bumper when installed within an x-small, small, medium, large, x-large, and xx-large pet crate having a front door, or a front door and a side door according to one embodiment of the present disclosure.
Figure 1C:
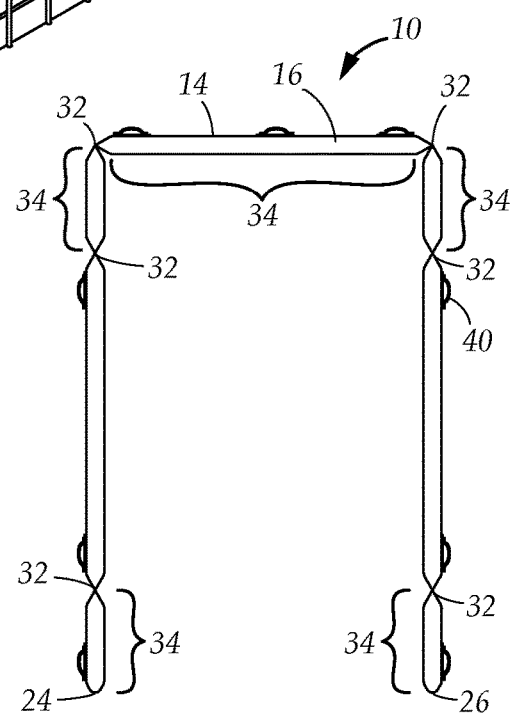
FIG. 1C is a top plan view of the universal pet crate bumper, illustrating the bumper in a front-door configuration according to one embodiment of the present disclosure.
Figure 2A:
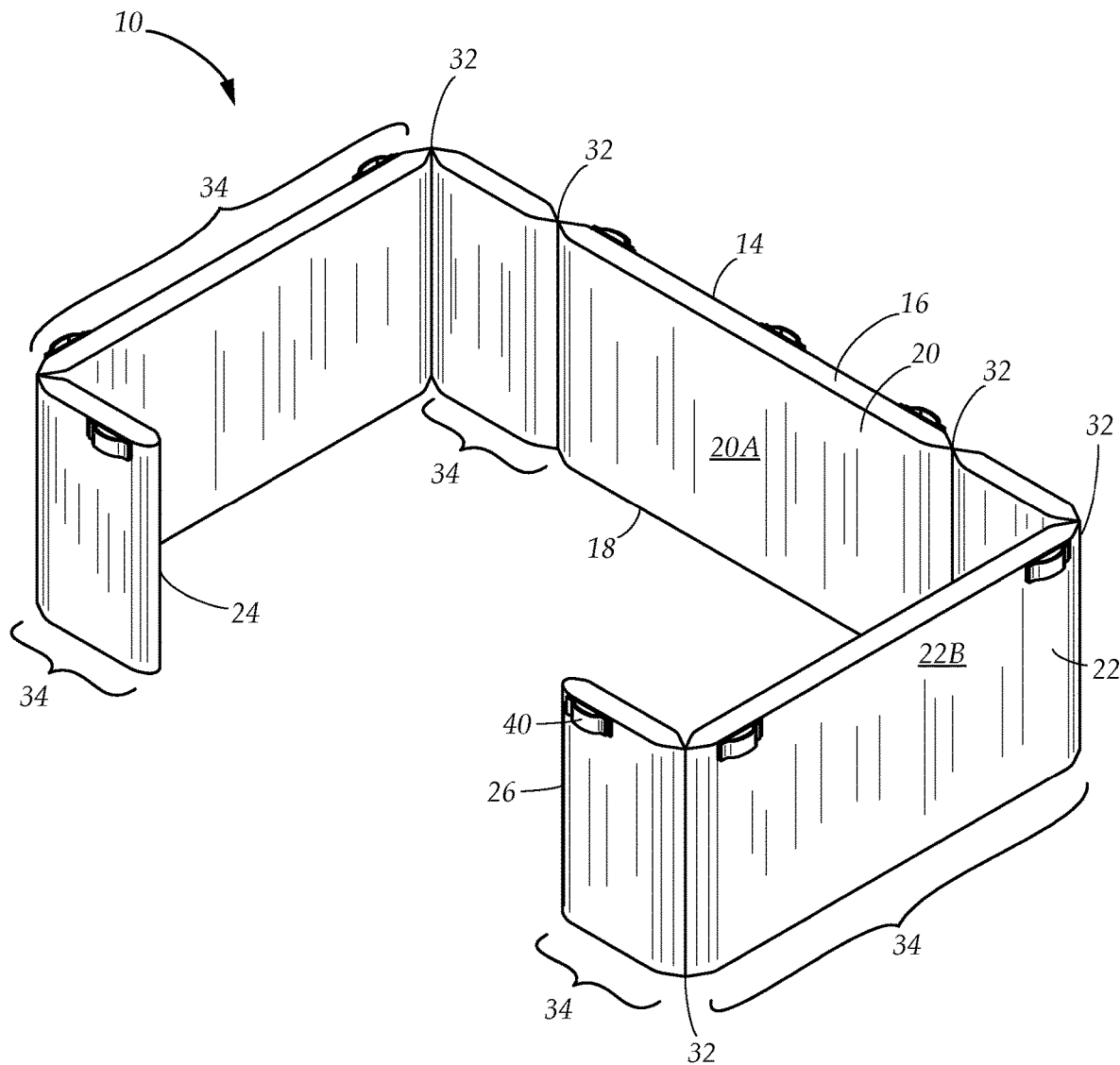
FIG. 2A is a perspective view of the universal pet crate bumper, illustrating the bumper in a side-door configuration according to one embodiment of the present disclosure.
Figure 2B:
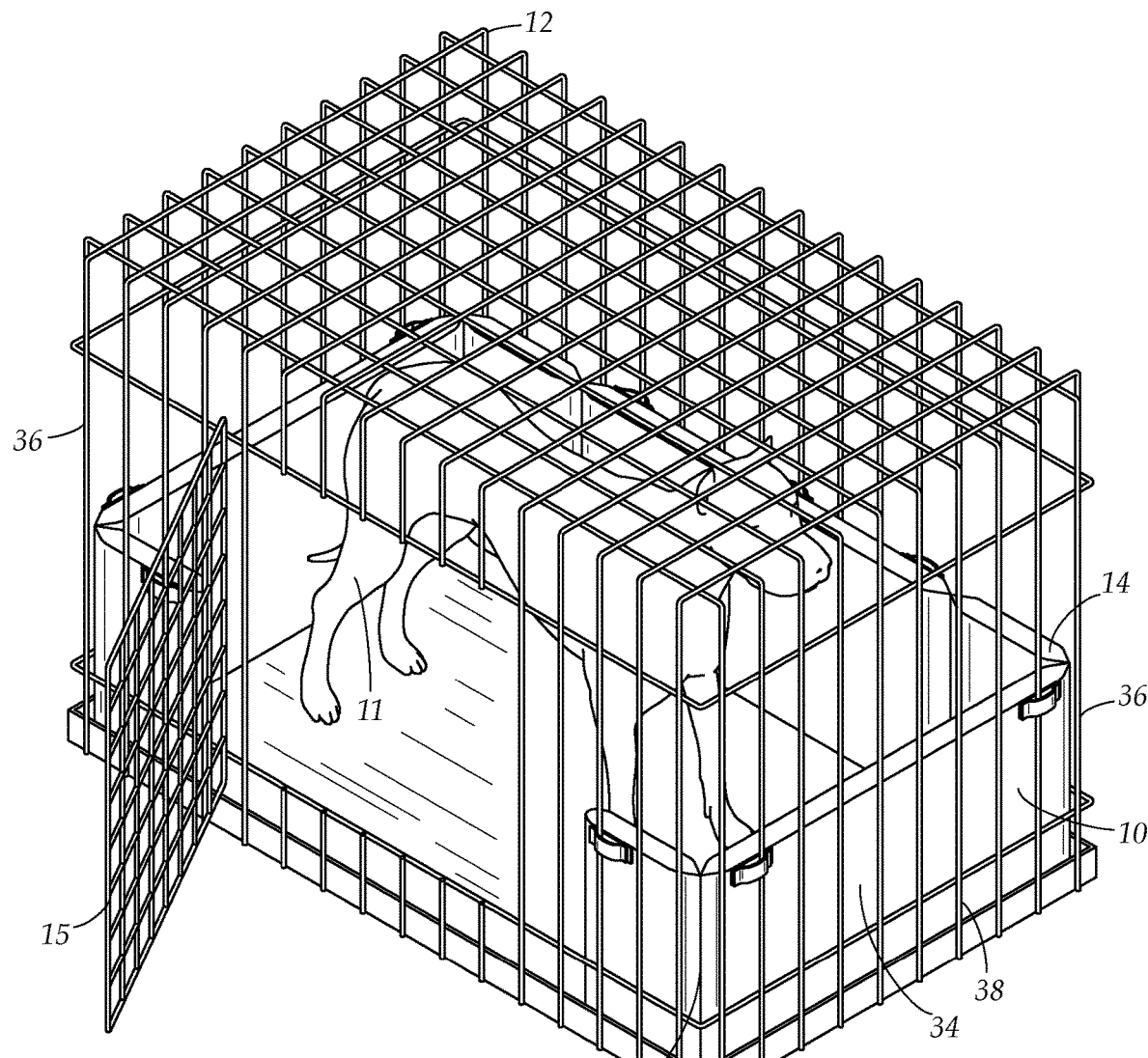
FIG. 2B is a perspective view of the universal pet crate bumper installed within a pet crate having a side door, illustrating the side-door configuration of the bumper when installed within an x-small and small pet crate having a front door, or a front door and a side door according to one embodiment of the present disclosure.
Figure 2C:
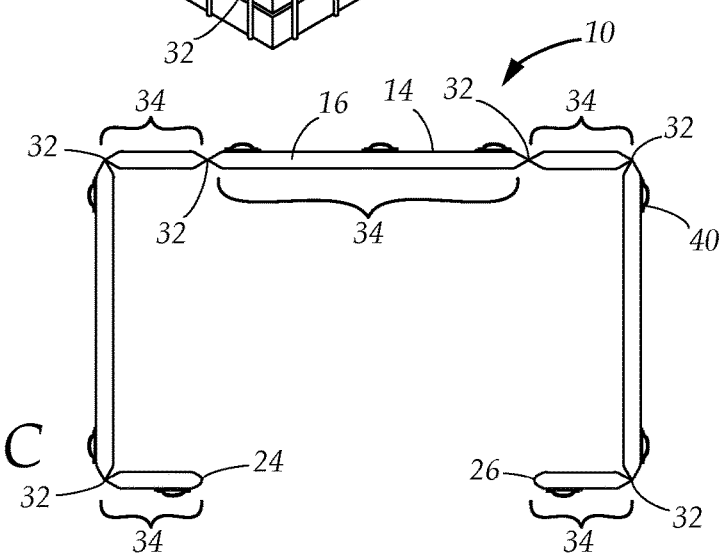
FIG. 2C is a top plan view of the universal pet crate bumper, illustrating the bumper in a side-door configuration according to one embodiment of the present disclosure.

The vertical lines of stitching 32 are positioned along the body 14 specifically to enable folding of the body 14 at areas that correspond to the corners 36 of the pet crate 12. The at least five distinct panels 34 individually, or in combination, correspond to any one of the sidewalls of the pet crate 12, whereby the vertical lines of stitching 32 correspond to the corners 36 of the pet crate 12 and enable at least 90-degree folding of the body 14 at the vertical lines of stitching 32 such that the body 14 may fit snuggly within the corners of the pet crate 12. In this way, the vertical lines of stitching 32 prevent bulky and protruding portions of the body 14 at the corners 36 of the pet crate 12, which detract from the aesthetics of the bumper 10 as well as the comfort of the animal. Further, the vertical lines of stitching 32 enable reconfiguration of the body 14 to accommodate a pet crate 12 having a front door or a side door, or both. For example, if the bumper 10 is being configured for front door use in a pet crate 12 having a front door 13 as shown in FIG. 1B then the configuration of the bumper is U-shaped as shown in FIG. 1A and FIG. 1C. If the bumper 10 is being configured for side door use in a pet crate 12 having a side door 15 as shown in FIG. 2B then the configuration of the bumper is C-shaped as shown in FIG. 2A and FIG. 2C. Depending on the size of the pet crate 12 the position/measurement of the vertical lines of stitching 32 with respect to the body 14 varies. For example, based on the list of pet crate sizes shown in Table 1, the at least four vertical lines of stitching 32 may include four vertical lines of stitching or six vertical lines of stitching having the following exemplary positions:

Exemplary Position of Vertical Stitching for X-Small to X-Large Pet Crates

| #1 | #2 | #3 | #4 | #5 | #6 |
|----|----|----|----|----|----|

Exemplary Position of Vertical Stitching for XX-Large Pet Crate

| #1 | #2 | #3 | #4 |
|----|----|----|----|

Table 2 shows exemplary measurements of the above exemplary positions of the vertical lines of stitching based on the size of the pet crate.

TABLE 2

Exemplary Measurements of the Body and the Vertical Lines of Stitching Measured from the First End of the Body Based on the Size of the Pet Crate.

| Size of Pet Crate | First Vertical Line of Stitching #1 | Second Vertical Line of Stitching #2 | Third Vertical Line of Stitching #3 | Fourth Vertical Line of Stitching #4 | Fifth Vertical Line of Stitching #5 | Sixth Vertical Line of Sticthing #6 | Total Length of Body |
|---|---|---|---|---|---|---|---|
| X-Small | 2.5" | 13.5" | 16.5" | 27.5" | 30.5" | 42" | 44" |
| Small | 3.5" | 19.5" | 23" | 39" | 42.5" | 58.5" | 62" |
| Medium | 7" | 24.5" | 28.5" | 46.5" | 53.5" | 71" | 75" |
| Large | 9.5" | 30.5" | 35" | 56" | 65" | 86" | 91" |
| X-Large | 11" | 38" | 41.5" | 68.5" | 78.5" | 105.5" | 110" |
| XX-Large | 18" | 47" | 75" | 93" | X | X | 122" | panel 34B that accommodates a sidewall of the pet crate, a third vertical line of stitching 32C is spaced from the first end 24 at a third distance D3 to form a third panel 34C that accommodates a sidewall of the pet crate, a fourth vertical line of stitching 32D is spaced from the second end 26 at a fourth distance D4 to form a fourth panel 34D that accommodates a sidewall of the pet crate, a fifth vertical line of stitching 32E is spaced from the second end 26 at a fifth distance D5 to form a fifth panel 34E that accommodates a sidewall of the pet crate, and a sixth vertical line of stitching 32F is spaced from the second end 26 at a sixth distance D6 to form a sixth panel 34F and a seventh panel 34G that accommodates a sidewall of the pet crate. The second vertical line of stitching 32B and the third vertical line of stitching 32C, which also define panel 34C, form a seventh distance D7 therebetween. The fourth vertical line of stitching 32D and the fifth vertical line of stitching 32E, which also define panel 34E, form an eighth distance D8 therebetween. The third distance D3 and the fourth distance D4 are substantially equal.

Figure 3A:
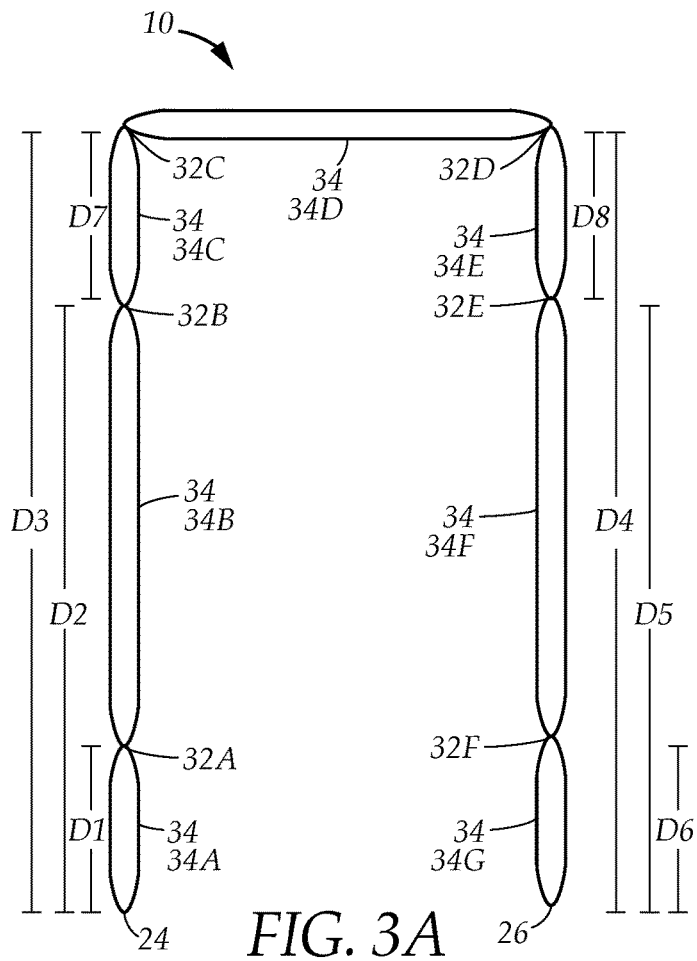
FIG. 3A is a top plan view of the universal pet crate bumper, illustrating the universal configuration into which the bumper articulates when positioned for front door compatibility in any size pet crate having a front door, or a pet crate having a front door and a side door, according to one embodiment of the present disclosure.

Referring specifically to FIG. 3A, with reference to Table 2, for the small pet crate, so that the bumper 10 may accommodate both a front door and a side door pet crate, the second distance D2 and the fifth distance D5 are substantially equal, the first distance D1 and the sixth distance D6 are substantially equal, and the eighth distance D8 and the seventh distance D7 are substantially equal.

Figure 3B:
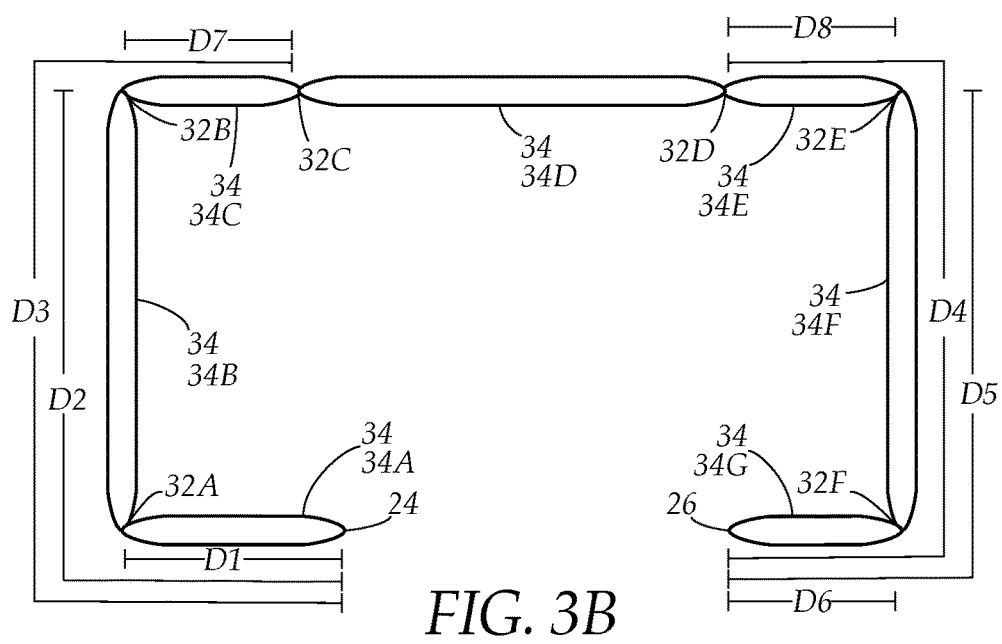
FIG. 3B is a top plan view of the universal pet crate bumper, illustrating the universal configuration into which the bumper articulates when positioned for side door compatibility in a small or extra small size pet crate having a side door, or a pet crate having a front door and a side door, according to one embodiment of the present disclosure.

Referring specifically to FIG. 3B, with reference to Table 2, for the x-small pet crate, so that the bumper 10 may accommodate both a front door and a side door pet crate, the second distance D2 and the fifth distance D5 are substantially equal, the first distance D1 is larger than the sixth distance D6, and the eighth distance D8 and the seventh distance D7 are substantially equal.

Figure 3C:
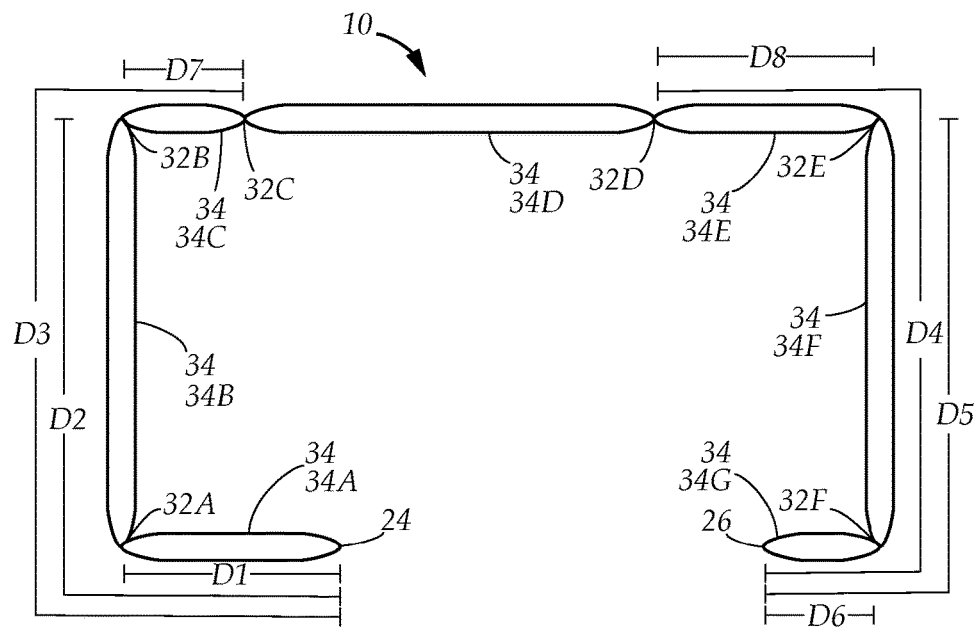
FIG. 3C is a top plan view of the universal pet crate bumper, illustrating the universal configuration into which the bumper articulates when positioned for side door compatibility in a medium, a large, or x-large pet crate having a side door, or a pet crate having a front door and a side door, according to one embodiment of the present disclosure.

Referring specifically to FIG. 3C, with reference to Table 2, for the medium, large, and x-large pet crates, so that the bumper 10 may accommodate both a front door and a side door pet crate, the second distance D2 is larger than the fifth Referring now to FIG. 3A, FIG. 3B, and FIG. 3C, with reference to Table 2, the x-small, small, medium, large, and x-large pet crates, the bumper 10 includes six vertical lines of stitching, wherein a first vertical line of stitching 32A is spaced from the first end 24 at a first distance D1 to from a first panel 34A that accommodates a sidewall of the pet crate, a second vertical line of stitching 32B is spaced from the first end 24 at a second distance D2 to form a second distance D5, the first distance D1 is larger than the sixth distance D6, and the eighth distance D8 is larger than the seventh distance D7.

Figure 3D:
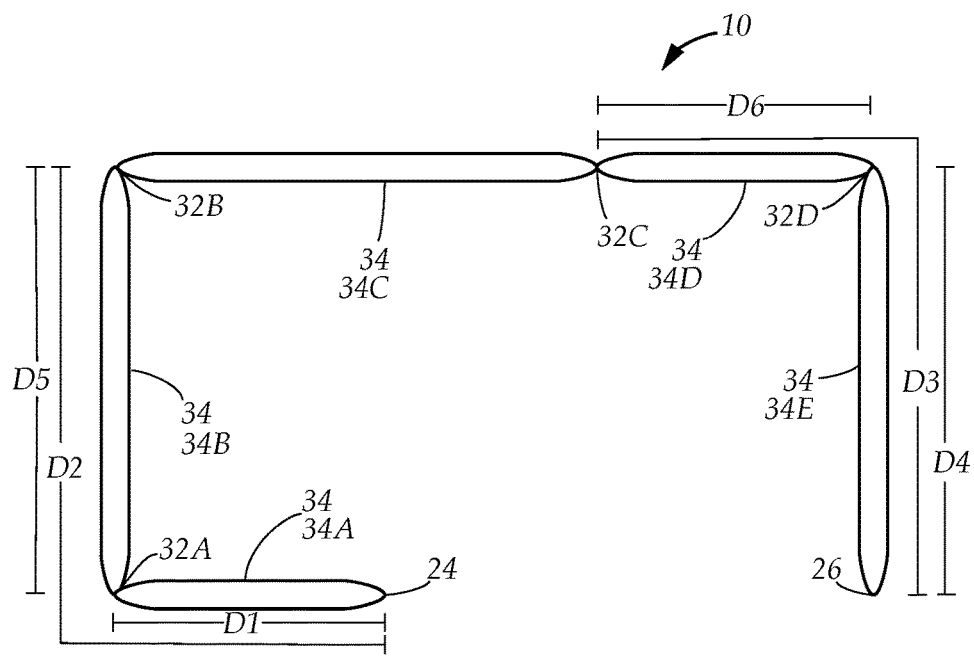
FIG. 3D is a top plan view of the universal pet crate bumper, illustrating the universal configuration into which the bumper articulates when positioned for side door compatibility in a xx-large pet crate having a side door, or a pet crate having a front door and a side door, according to one embodiment of the present disclosure.

Referring to FIG. 3D, with reference to Table 2, for the xx-large pet crate, the bumper 10 includes four vertical lines of stitching, wherein a first vertical line of stitching 32A is spaced from the first end 24 at a first distance D1 to from a first panel 34A that accommodates a sidewall of the pet crate, a second vertical line of stitching 32B is spaced from the first end 24 at a second distance D2 to form a second panel 34B that accommodates a sidewall of the pet crate, a third vertical line of stitching 32C is spaced from the second end 26 at a third distance D3 to form a third panel 34C that accommodates a sidewall of the pet crate, and a fourth vertical line of stitching 32D is spaced from the second end 26 at a fourth distance D4 to form a fourth panel 34D and a fifth panel 34E that accommodates a sidewall of the pet crate. The first vertical line of stitching 32A and the second vertical line of stitching 32B, which also define the second panel 34B, form a fifth distance D5 therebetween. The third vertical line of stitching 32C and the fourth vertical line of stitching 32D, which also define panel 34D, form a sixth distance D6 therebetween. So that the bumper 10 may accommodate both a front door and a side door pet crate, the fourth distance D4 is larger than the first distance D1, the second distance D2 and the third distance D3 are substantially equal, and the fifth distance D5 is larger than the sixth distance D6.

Figure 4A:
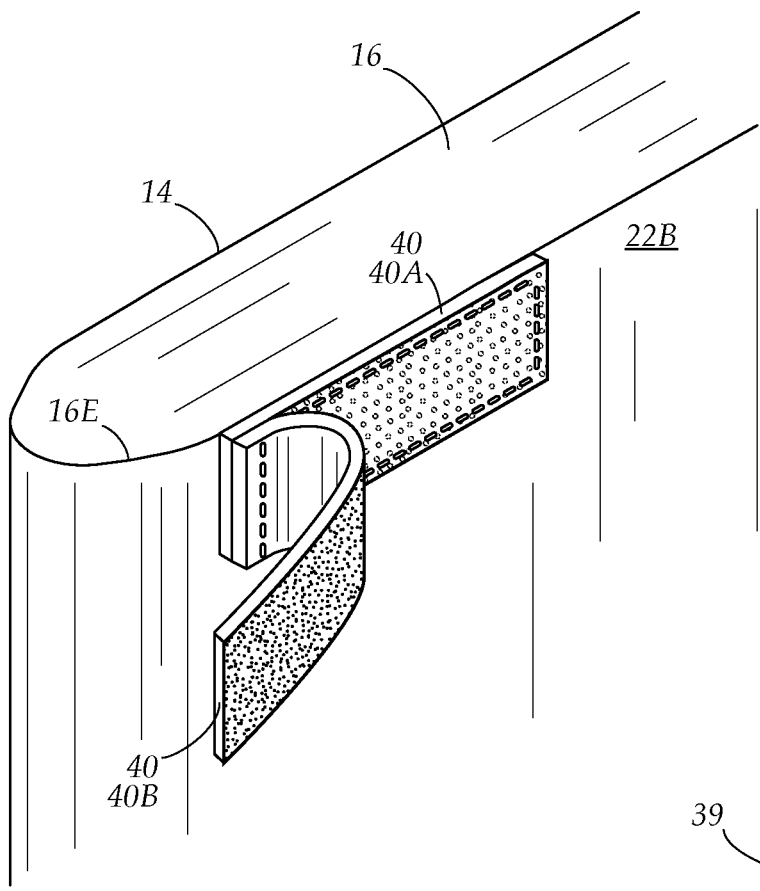
FIG. 4A is a close-up view of a fastener of the universal pet crate bumper, illustrating a manner in which the fastener is attached to the bumper according to one embodiment of the present disclosure.
Figure 4B:
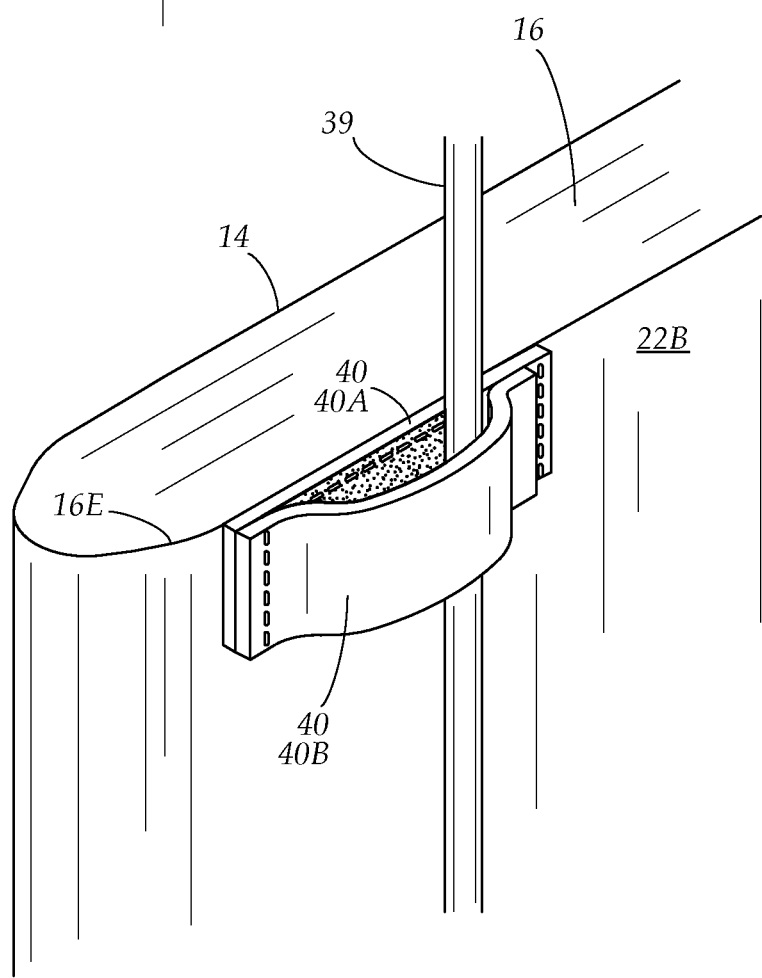
FIG. 4B is a close-up view of a fastener of the universal pet crate bumper, illustrating a manner in which the fastener is attached to the bumper according to one embodiment of the present disclosure.
Figure 5:
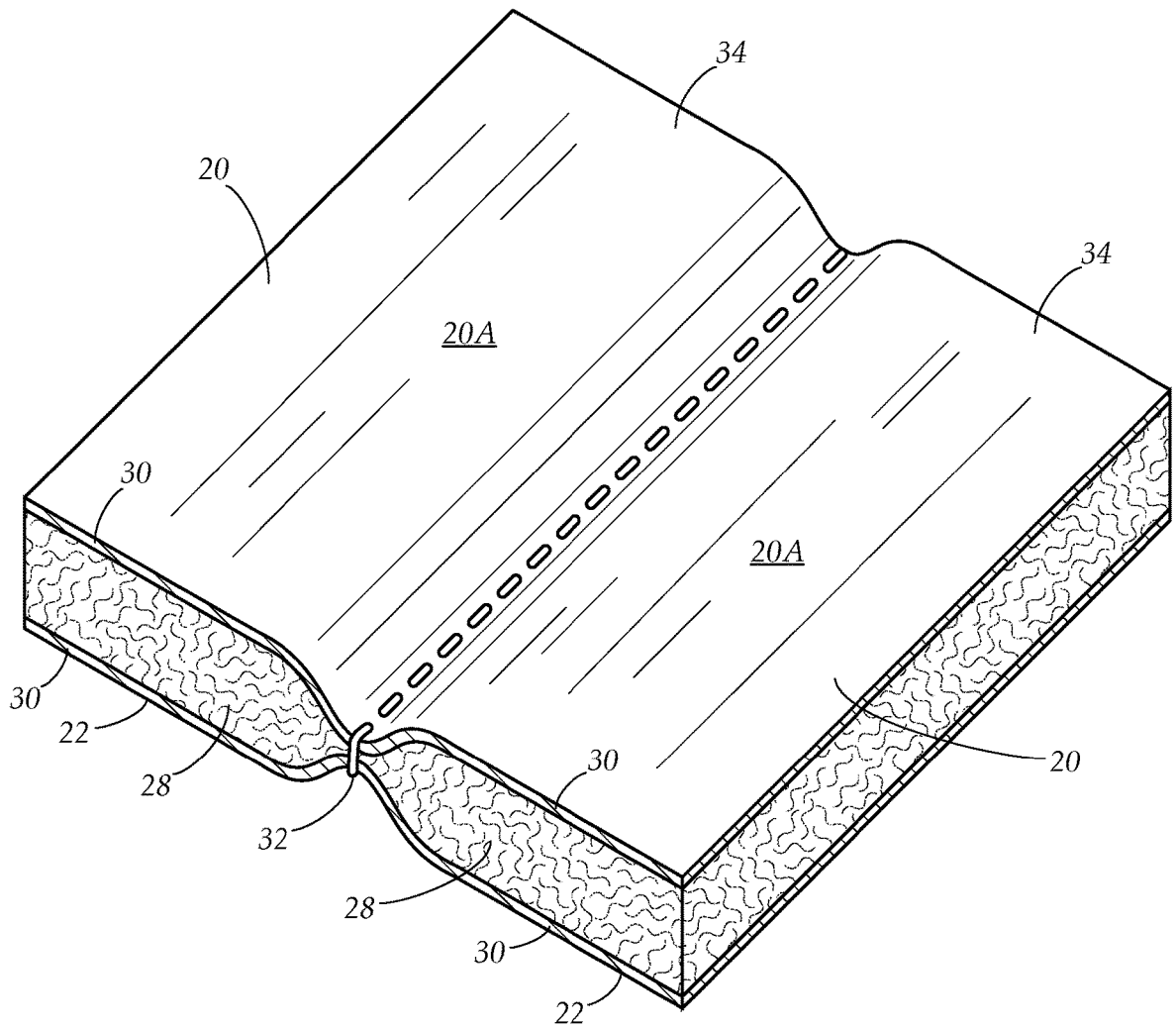
FIG. 5 is a perspective cross-section view of the universal pet crate bumper, illustrating the vertical stitching across the bumper, which defines the panels, as well as the high thickness and density of the internal filling of the universal pet crate bumper, according to one embodiment of the present disclosure.

Referring now to FIG. 4A and FIG. 4B, with reference to FIG. 1B, the fasteners 40 are positioned at an edge 16E of the upper end 16. Each of the fasteners 40 comprises a fixed portion 40A attached to the rear surface 22B of the body 14 and a free portion 40B pivotally connected to an end of the fixed portion 40A, which enables the free portion 40B to pivot with respect to the body 14 and the fixed portion 40A. The free portion 40B includes a length enabling the free portion 40B to wrap around a bar 39 of the pet crate 12 and engage the fixed portion 40A to fasten the body 14 to the sidewalls 38 of the pet crate 12. In embodiments, the fastener 40 comprises a hook and loop fastener, such as Velcro, in which the fixed portion 40A defines the hoop portion of the hook and loop fastener and the free portion 40B defines the loop portion of the hook and loop fastener. At least five of the distinct panels 34 include at least one of the plurality of fasteners 40.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly. The term "substantially" is defined as at least 95% of the term being described and/or within a tolerance level known in the art and/or within 5% thereof.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a universal pet crate bumper. The disclosure is illustrated by example in the drawing figures, and throughout the written description. It should be understood that numerous variations are possible, while adhering to the inventive concept. Such variations are contemplated as being a part of the present disclosure.

What is claimed is:

1. A universal pet crate bumper for placement inside of a pet crate having four corners and four sidewalls defining two short sidewalls and two long sidewalls and a door located on at least one of the short sidewall or the long sidewall, the universal pet crate comprising:

a rectangular unitary body including an upper end, a lower end, the upper end opposite the lower end, a front side including a front surface, a rear side including a rear surface, the front side opposite the rear side, a first end, a second end, the first end opposite the second end, an internal batting including a uniform thickness spanning the length and width of the body, an outer fabric layer enclosing the internal batting, and six vertical lines of stitching positioned unevenly along a length of the rectangular unitary body and extending from an uppermost edge of the upper end to a lowermost edge of the lower end thereof and through the internal batting from the front surface to the rear surface, each of the six vertical lines of stitching compressing the internal batting along the respective line of stitching to form distinct panels along the body between the lines of stitching, each of the six lines of stitching defining a pivot upon which the panels fold at least 90 degrees with respect to one another, the pivots enabling folding of the body at areas along the body that correspond to corners of the pet crate such that the body may fit snuggly within the corners of the pet crate, the panels corresponding to at least some of the sidewalls of the pet crate, the internal batting including a compact and dense structure enabling the body to maintain an upright orientation along the sidewalls of the pet crate, wherein the six vertical lines of stitching include a first vertical line of stitching spaced from the first end at a first distance defining a first panel, a second vertical line of stitching spaced from the first vertical line of stitching at a second distance defining a second panel, a third vertical line of stitching spaced from the second vertical line of stitching at a third distance defining a third panel, a fourth vertical line of stitching spaced from the third vertical line of stitching at a fourth distance defining a fourth panel, a fifth vertical line of stitching spaced from the fourth vertical line of stitching at a fifth distance defining a fifth panel, and a sixth vertical line of stitching spaced from the fifth vertical line of stitching at a sixth distance defining a sixth panel, and a seventh distance defining a seventh panel between the second end and the sixth vertical line of stitching, and wherein the second distance of the second panel, the fourth distance of the fourth panel, and the sixth distance of the sixth panel are equal to each other and correspond to a length of the short sidewall of the pet crate, the first distance of the first panel, the third distance of the third panel, the fifth distance of the fifth panel, and the seventh distance of the seventh panel each being smaller than the second distance of the second panel, the fourth distance of the fourth panel, and the sixth distance of the sixth panel, thereby the universal pet crate bumper can be universally positioned inside the pet crate to allow unobstructed entry thereto through the door thereof regardless of the door located on the short sidewall or the long sidewall of the pet crate.

2. The universal pet crate bumper, as in claim 1, wherein a sum of the first distance, the second distance and the third distance is equal to the sum of the fifth distance, the sixth distance, and the seventh distance, and is equal to a length of the long sidewall of the pet crate.

3. The universal pet crate bumper, as in claim 1, further comprising a plurality of fasteners, wherein each fastener comprises a fixed portion attached to the rear surface of the body and a free portion pivotally connected to the fixed portion enabling pivoting with respect to the body and the fixed portion, the free portion removably attachable to the fixed portion, and wherein at least one fastener is located at the first end and the second end of the universal pet crate bumper, and at least two fasteners are located on both ends of each of the second panel along the second distance, the fourth panel along the fourth distance, and the sixth panel along the sixth distance thereof.

* * * * *